US005534075A

United States Patent [19]

Miyawaki et al.

[11] Patent Number: 5,534,075

[45] Date of Patent: Jul. 9, 1996

[54] PROCESS FOR THE PRODUCTION OF GLUCOSE

[75] Inventors: Isamu Miyawaki; Kikuzo Kaneko, both of Tokyo, Japan

[73] Assignee: Organo Corporation, Japan

[21] Appl. No.: 308,206

[22] Filed: Sep. 19, 1994

Related U.S. Application Data

[63] Continuation of Ser. No. 084,594, Jul. 1, 1993, abandoned.

[30] Foreign Application Priority Data

Jul. 7, 1992 [JP] Japan .................................... 4-201881

[51] Int. Cl.$^{6}$ ................................ C13J 1/06; C02F 1/00; C02F 1/28; B01D 15/08

[52] U.S. Cl. ........................ 127/46.1; 127/46.2; 210/632; 210/656; 210/659; 210/660

[58] Field of Search ................................. 127/46.1, 46.2; 210/632, 656, 659, 660

[56] References Cited

U.S. PATENT DOCUMENTS

| | | | |
|---|---|---|---|
| 3,756,919 | 9/1973 | Deaton | 127/40 |
| 3,817,787 | 6/1974 | Von Hertzen et al. | 127/46.2 |
| 4,109,075 | 8/1978 | Deaton | 536/1 |
| 4,133,696 | 1/1979 | Barker et al. | 127/46.2 |
| 4,330,625 | 5/1982 | Miller et al. | 127/46.2 |
| 4,614,548 | 9/1986 | Cameron et al. | 127/46.2 |

*Primary Examiner*—Glenn Caldarda
*Assistant Examiner*—Patricia L. Hailey
*Attorney, Agent, or Firm*—Nixon & Vanderhye

[57] ABSTRACT

Disclosed is a process for producing high-purity glucose by saccharifying liquefied starch with the aid of an enzyme, in which the saccharification reaction of the liquefied starch is discontinued at a point where the glucose content is less than 96% by weight, preferably within the range of 80 to 93% by weight, on a solid basis. The resulting saccharified solution is filtered, concentrated and softened as required, and then fractionated by subjecting it to column chromatography. Thereafter, the resulting glucose fraction is recovered. This process makes it possible to produce high-purity glucose efficiently in spite of a reduction in saccharification time.

6 Claims, 2 Drawing Sheets

PROCESS FOR THE PRODUCTION OF GLUCOSE

This is a Rule 62 File Wrapper continuation of application Ser. No. 08/084,594, filed Jul. 1, 1993, now abandoned.

BACKGROUND OF THE INVENTION

1. Field of the Invention

This invention relates to a process for producing high-purity glucose (grape sugar) by saccharifying starch with the aid of an enzyme and, more particularly, to such a process for producing glucose wherein the saccharification time of starch is reduced so as to enhance operating efficiency and facilitate quality control.

2. Description of the Prior Art

Generally, the process for producing high-purity glucose by saccharifying starch with the aid of an enzyme can be schematically represented by the following flow sheet:

(Starch milk preparation step)→(Starch milk liquefaction step)→(Saccharification step)→(Filtration step)→(Intermediate concentration step) →(Activated carbon decolorization step)→(Deionization refining step).

In order to produce high-purity glucose in this process, it is necessary to add a saccharifying enzyme to the liquefied starch solution resulting from the above starch milk liquefaction step and carry out its saccharification until a saccharified solution usually having a glucose content of 97% by weight or greater is obtained. For this purpose, the residence time in a batch type saccharification tank should be as long as 40 to 60 hours at a temperature of 55° to 65° C. Since such a long time is required for saccharification, large-scale saccharification equipment and a large site are needed in order to secure certain outputs. Moreover, such a long saccharification time also requires the implementation of strict quality control in order to inhibit the propagation of microorganisms, suppress the formation of impurities, and control the pH level during saccharification. Thus, the prior art production process leaves much to be desired with regard to the production efficiency and production control of glucose.

SUMMARY OF THE INVENTION

In view of the above-described drawbacks to the prior art, the primary object of the present invention is to reduce the saccharification time (i.e., the residence time of the liquefied starch solution in the saccharification tank) by discontinuing the saccharification reaction in the course of the saccharification step of a glucose production process and separating the resulting saccharified solution into a plurality of fractions by column chromatography, so that the quality control labor conventionally required in the saccharification step may be minimized and the production efficiency may be enhanced without using a large-scale saccharification tank.

In order to accomplish this object, the present invention provides a process for producing high-purity glucose by saccharifying liquefied starch with the aid of an enzyme, which comprises the steps of discontinuing the saccharification reaction of the liquefied starch at a point where the glucose content is less than 96% by weight on a solid basis, fractionating the resulting saccharified solution by subjecting it to column chromatography, and recovering the resulting glucose fraction. By discontinuing the saccharification reaction at an intermediate point and fractionating the resulting saccharified solution by column chromatography, high-purity glucose can be obtained in spite of the reduction in saccharification time. Thus, it is possible to enhance the production efficiency, reduce the size of the saccharification equipment, and save much of the quality control labor required to inhibit the propagation of microorganisms, suppress the formation of impurities, and control the pH level. Moreover, this production process makes it possible to employ a columnar saccharification method using a column charged with an immobilized saccharifying enzyme or a continuous saccharification method using a tubular reactor or the like in place of a conventional batch type saccharification tank.

In a preferred embodiment of the saccharification reaction in the above-described production process, the saccharification reaction is discontinued at a point where the glucose content is within the range of 80 to 93% by weight (hereinafter, percentages are by weight unless otherwise stated), or the saccharification reaction is carried out at a temperature of 55° to 65° C. for a period of 10 to 36 hours. This causes the above-described effects to become more conspicuous.

In a preferred embodiment of the chromatographic fractionation in the above-described production process, the plurality of eluate protions obtained by column chromatography are collected into a glucose fraction, an oligosaccharide fraction and an ash-color fraction. When the eluate is separated into these three fractions, the oligosaccharide fraction may be concentrated, purified and utilized as starch syrup or other oligosaccharide products, and the ash-color fraction may be utilized as a constituent of livestock feed after or without being concentrated. Thus, byproducts from the glucose production can be utilized effectively.

Moreover, the yield of glucose can be enhanced by recycling the oligosaccharide fraction to the liquefied starch saccharification step after or without being concentrated.

Furthermore, in the above-described production process, the efficiency of the fractionation by column chromatography can be enhanced by filtering and concentrating the saccharified solution before subjecting it to column chromatography, and/or by passing the saccharified solution through a softening column before subjecting it to column chromatography.

The efficiency of the fractionation by column chromatography can further be enhanced when the packing material used for column chromatography is an ion-exchange resin (preferably a cation-exchange resin and more preferably a strongly acidic cation-exchange resin) and when the packing material of the softening column is the same as the packing material used for column chromatography.

DETAILED DESCRIPTION OF THE PREFERRED EMBODIMENTS

As used herein, the term "high-purity glucose" usually means glucose having a purity of 97% or greater and preferably 98% or greater. However, the production process of the present invention is also applicable to cases where the desired purity of glucose is lower.

The material saccharified in the present invention is starch (such as corn or potato starch) which has been liquefied. The liquefaction of starch can be carried out according to any conventional procedure. Usually, starch is reacted at a temperature of about 95° to 100° C. for a period of about 1 to 2 hours in the presence of α-amylase that liquefies starch by hydrolytically splitting linkages within the substrate molecules.

Figure 1:
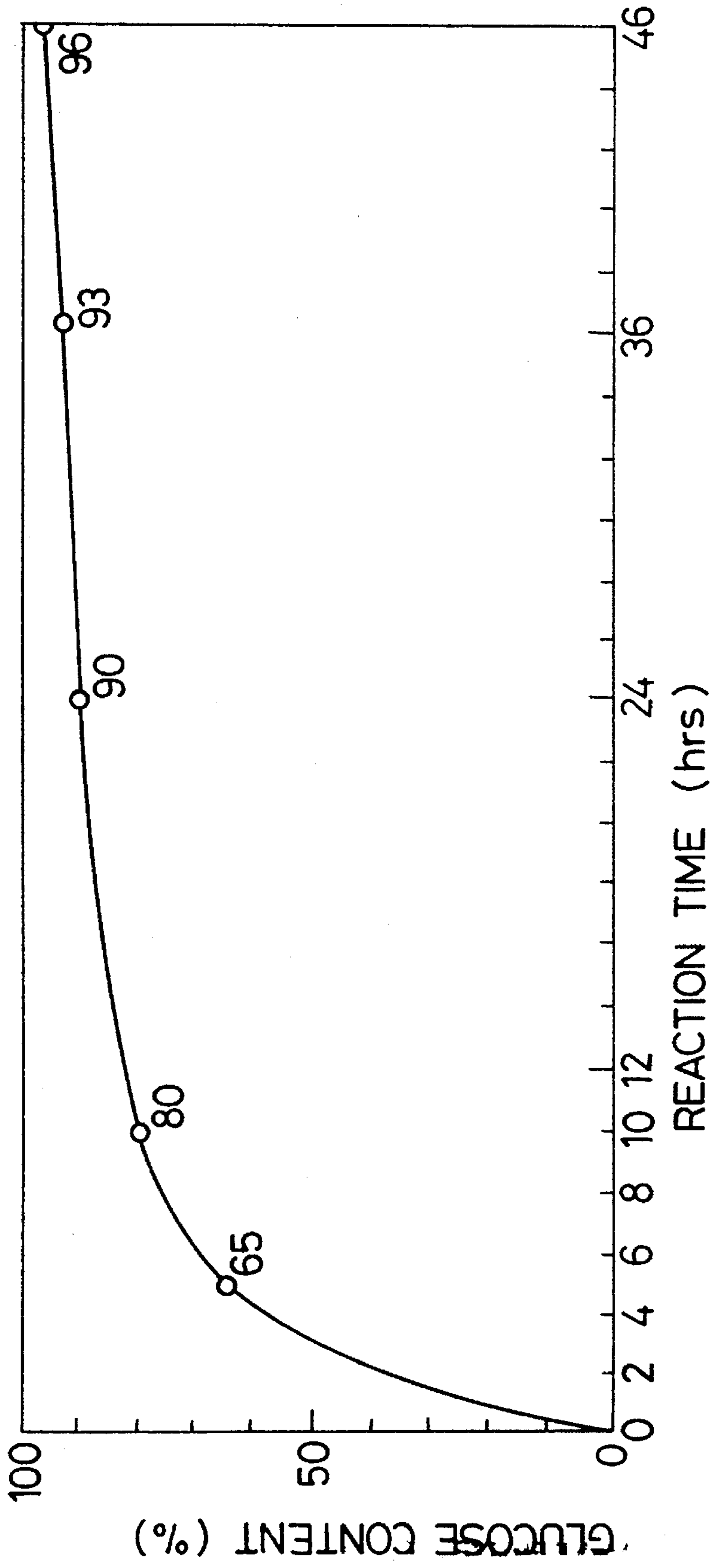
FIG. 1 is a graph showing the relationship between the saccharification reaction time of liquefied starch and the glucose content of the saccharified solution.

Then, the liquefied starch is saccharified. The enzyme used for this purpose is usually glucoamylase that acts on the nonreducing terminals of starch to form glucose. Generally, where liquefied starch is saccharified with the aid of an enzyme, the relationship between the saccharification reaction time and the glucose content of the saccharified solution is as shown in FIG. 1. Specifically, the glucose content does not exhibit a linear increase, but a logarithmic increase in which the slope of the curve is steep at the beginning and becomes gentler gradually. Although the curve shown in FIG. 1 was obtained by carrying out the saccharification reaction under the conditions employed in the example which is will be given later, a similar relationship is observed even under other conditions. In order to produce high-purity glucose (i.e., glucose having a purity of 97% or greater), it has been necessary in the conventional saccharification process to continue the saccharification reaction until the glucose content of the saccharified solution reaches 96% or greater (usually 97% or greater). Thus, in the case shown in FIG. 1, it has been necessary to carry out the saccharification reaction for a period of 46 hours or more (usually 48 hours or more). The aforementioned shortcoming or longer reaction time is of the prior art are attributable to the fact that the saccharification rate is not constant but shows a logarithmic change. More specifically, in order to produce high-purity glucose, it is necessary to raise the glucose content of the saccharified solution to 96% or greater. In the case shown in FIG. 1, the glucose content increases to 80% in 10 hours after initiation of the saccharification reaction. Thereafter, the glucose content increases by 10% and reaches 90% in another 14 hours (24 hours after initiation of the saccharification reaction), and then increases by only 6% and reaches 96% in another 22 hours (46 hours after initiation of the saccharification reaction). Thus, it takes as long as 22 hours for the glucose content to increase from 90% to 96%. A much longer time will be required to increase the glucose content to greater than 96%. Such a marked lowering of the saccharification rate with time causes considerable time and labor to be spent.

In the present invention, high-purity glucose can be produced by carrying out the saccharification reaction for a relatively short period of less than 46 hours (preferably within the range of 10 to 36 hours), discontinuing it at a point where the glucose content is less than 96% (preferably within the range of 80 to 93%), and fractionating the resulting saccharified solution by column chromatography to separate glucose. Thus, after the saccharification reaction is initiated, the saccharification is allowed to proceed efficiently for a period of time where the saccharification rate is high, and the final stage of saccharification in which the saccharification rate becomes lower is omitted. This can enhance the efficiency of the saccharification step remarkably. The most efficient period of time may be properly chosen according to the type, activity and amount of enzyme used for saccharification. Usually, a reaction time of 24 hours or so makes it possible to produce high-purity glucose most efficiently. If the reaction time is too short, the saccharification of the liquefied starch does not proceed satisfactorily, resulting in an insufficient formation of glucose and a low yield of glucose. However, where it is desired to produce, in addition to glucose, other saccharides such as oligosaccharides, the saccharification reaction may be allowed to proceed to a degree suitable for that purpose. If the reaction time is too long, the application of the present invention is meaningless. The saccharification reaction time can readily be controlled by monitoring changes in the light transmittance (or clarity) of the saccharified solution instead of measuring its glucose content at regular intervals.

Basically, the saccharification reaction itself can be carried out according to any conventional procedure. The liquefied starch used for the saccharification reaction may have a total solid content of about 30 to 37% and a pH of about 4.5 to 5.0. The enzyme used for this purpose is glucoamylase, and may be added in an amount of about 50 to 80 AGU (Amyloglucosidase Units)/liter. The reaction temperature may be within the range of about 55° to 65° C.

The resulting saccharified solution is subjected to filtration, concentration and decolorization steps as required, and then fractionated by column chromatography. High treating efficiency can be achieved if the saccharified solution introduced into the chromatographic column has a total solid content of about 58 to 62% and a pH of about 5.5 to 7.0. In the chromatographic column, any packing material capable of selectively separating glucose, such as ion-exchange resins, zeolite, alumina and other porous packing materials, may be used. In the present invention, any of various chromatographic techniques including gel permeation chromatography, adsorption chromatography, partition chromatography, ion-exchange chromatography and the like may be employed. Since glucose to be separated has a molecular weight different from those of other components such as oligosaccharides, the saccharified solution can be fractionated on the basis of differences in molecular size. However, it is preferable to use an ion-exchange resin (in particular, a cation-exchange resin) as the packing material and fractionate the saccharified solution on the basis of differences in affinity. Although cation-exchange resins include weakly acidic cation-exchange resins (in H form) and strongly acidic cation-exchange resins (in Na form), the resins in Na form are preferred in that, since their affinity for glucose is greater than that for other components (i.e., oligosaccharides and ash-color components), glucose is eluted from the column later and high separating efficiency is achieved. Moreover, the use of the cation-exchange resin in Na form also has the advantage that oligosaccharides can be separated from ash-color components and utilized effectively.

The saccharified solution may be passed through the chromatographic column either in a batch (one pass) flow process or in a circulating flow process. The batch flow process can be carried out by spotting the saccharified solution intermittently and collecting the glucose fraction while monitoring the eluate at the outlet of the column. It is convenient that the eluate portions from the chromatographic column are collected into an ash-color fraction, an oligosaccharide fraction and a glucose fraction. Especially in the batch flow process, the process conditions should be adjusted so that the difference in elution rate between the glucose and oligosaccharide fractions is maximized. Usually, the saccharified solution is separated into ash-color, oligosaccharide-rich, oligosaccharide, glucose-rich and glucose fractions, and the glucose fraction and a portion of the glucose-rich fraction are recovered as glucose. In the circulating flow process, glucose can be selectively recovered by recycling the oligosaccharide fraction alone, or both the oligosaccharide and the glucose-rich fraction, to the column, or by spotting an additional portion of the saccharified solution between the circulating glucose and oligosaccharide fractions. The flow rate may be suitably adjusted according to the type and volume of the packing material used.

Thus, it is also possible to recover the oligosaccharide and ash-color fractions concurrently separated by the chromatographic fractionation. The former fraction may be recycled to the saccharification step or utilized as starch syrup or an oligosaccharide product containing oligosaccharides such as maltose, maltotriose, maltotetraose and maltopentaose. The latter fraction may be discarded or utilized as a constituent of livestock feed.

In the production process of the present invention, the saccharified solution is preferably softened by passing it through a softening column, prior to the chromatographic fractionation. The main purpose of this pretreatment is to soften the saccharified solution (i.e., to replace calcium and magnesium ions with sodium ions and thereby reduce its hardness). The introduction of the softened saccharified solution into the chromatographic column is effective in maintaining the packing material in sodium form and thereby keeping the performance of chromatographic fractionation constant. Moreover, the passage of the saccharified solution through a softening column prior to the chromatographic column can effectively prevent contamination of the packing material used for the chromatographic fractionation. Preferably, the hardness of the saccharified solution is reduced to 0 to 0.5 mg (as CaCO3)/liter as a result of the softening treatment. No particular limitation is placed on the type of packing material used in the softening treatment step, and any of various packing materials such as ion-exchange resins, zeolite, alumina and other porous packing materials may be suitably used. However, the efficiency of glucose separation in the chromatographic fractionation can be significantly enhanced by using the same packing material as that used for the softening column. Since cation-exchange resins are especially preferred for use as the packing material of the chromatographic column, it is preferable to use a cation-exchange resin as the packing material for the softening pretreatment.

Steps other than those described above can basically be carried out according to any conventional procedure.

The present invention is further illustrated by the following example. However, this example is not to be construed to limit the scope of the invention.

Example 1

To 1 liter of a 30% aqueous solution of cornstarch was added 0.5 g of α-amylase (Termamyl 60L, a product of Novo, Nordisk). The resulting solution was adjusted to pH 6.5 and then reacted at 90° C. for 2 hours to liquefy the corn starch. This solution was adjusted to pH 4.5, followed by the addition of 0.2 g of glucoamylase (AMG-300L, a product of Novo, Nordisk; activity 250 AGU/g). The resulting solution was saccharified at 60° C. for 24 hours.

The saccharified solution was filtered through diatomaceous earth and then concentrated to obtain a solution having the following properties:

| | |
|---|---|
| Bx | 60.2 |
| pH | 4.39 |
| Electric conductivity | 170 μS/cm (at Bx 30) |

-continued

| | |
|---|---|
| Clarity ($-\log T_{720\ nm}$) | 0.015 (10 mm cell, pH 7) |
| ($-\log T_{420\ nm}$) | 0.060 (10 mm cell, pH 7) |
| Total cations | 550 mg (as $CaCO_3$)/liter |
| Total hardness | 250 mg (as $CaCO_3$)/liter |

This solution was passed through a column packed with 100 ml of a cation-exchange resin for softening treatment (Amberlite IR-120B in Na form with particle sizes within a range of 0.45 to 1.0 mm accounting for more than 90%) to obtain a solution having the following properties:

| | |
|---|---|
| Bx | 58.0 |
| pH | 4.8 |
| Total cations | 550 mg (as $CaCO_3$)/liter |
| Total hardness | 0 mg (as $CaCO_3$)/liter |
| Sugar composition (measured by HPLC) | |
| Ash-color | 6.7% |
| Oligosaccharides | 5.3% |
| Glucose | 88.0% |

This solution was introduced into a column chromatographic apparatus as described below and fractionated under the following conditions:

| | |
|---|---|
| Packing material | Cation-exchange resin in Na form (the same as that used for softening treatment, except that particle sizes falling within a range of 0.22 to 0.33 mm accounting for more than 90%), 300 ml, 1-meter bed depth |
| Feed solution supplied | 22.5 ml |
| Eluent | 1/10,000 N NaOH |
| Eluent flow rate | LV = 3 |

Figure 2:
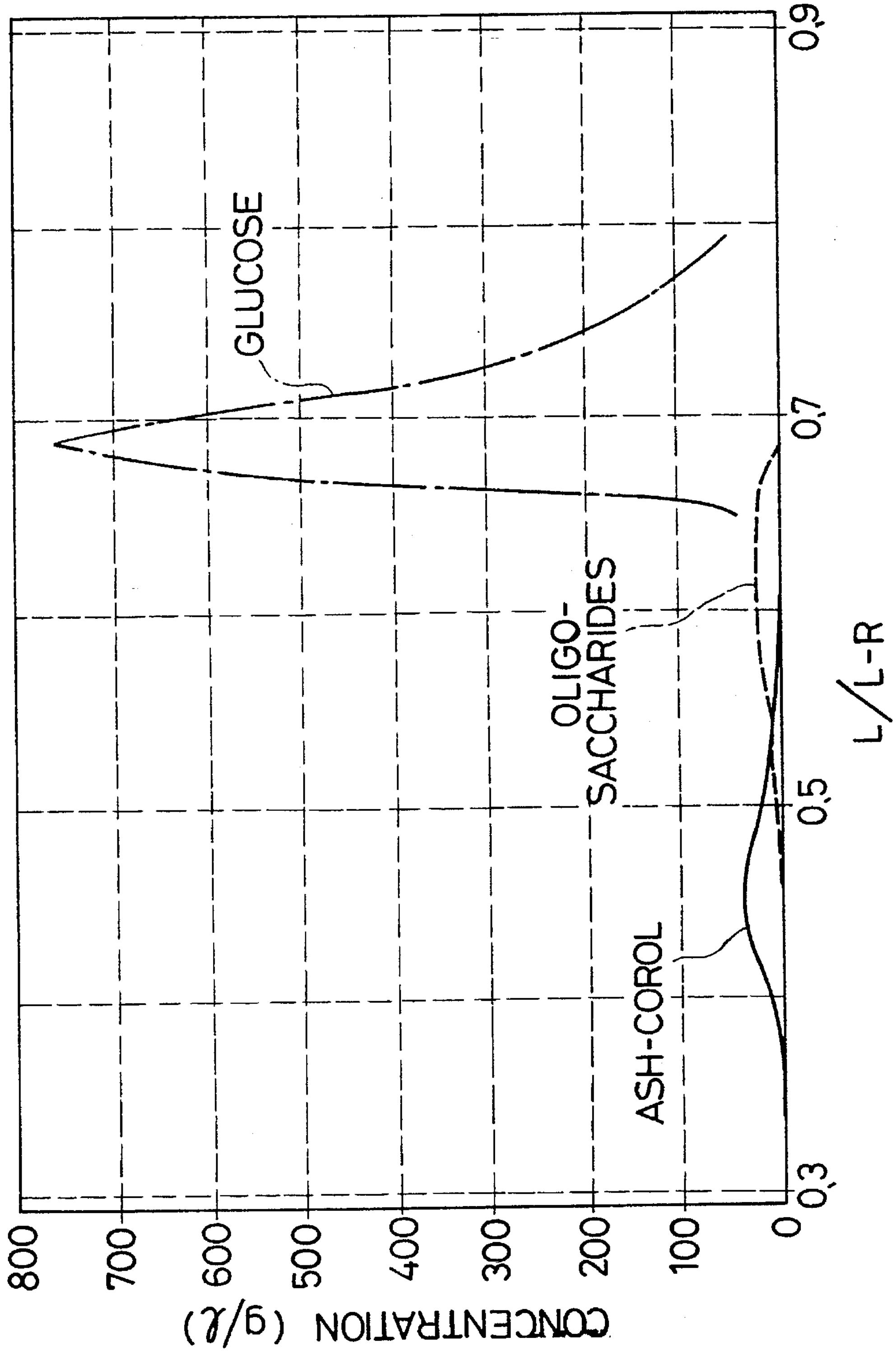
FIG. 2 is a graph showing the separation of glucose by chromatographic fractionation in the example which will be given later.

The results of fractionation are shown in TABLE 1 and FIG. 2 (where "L/L-R" represents the volume of eluate per unit volume of the packing material). A glucose solution having a glucose content of 99.6% was obtained by recovering fraction Nos. 20–28. The recovery of glucose was 95.6%.

TABLE 1

| Eluate Sample No. | Eluate Sampled L/L-R | Concentration (g/l) Ash-color | Oligosaccharides | Glucose | Glucose content (%) |
|---|---|---|---|---|---|
| Feed solution | 0.00 | 48.24 | 38.16 | 657.79 | 88.39 |
| 1 | 0.35 | 0.00 | 0.00 | 0.00 | 0.00 |
| 2 | 0.37 | 3.98 | 0.00 | 0.00 | 0.00 |
| 3 | 0.38 | 3.98 | 0.00 | 0.00 | 0.00 |
| 4 | 0.40 | 12.33 | 0.00 | 0.00 | 0.00 |
| 5 | 0.42 | 36.52 | 0.00 | 0.00 | 0.00 |
| 6 | 0.44 | 34.37 | 0.00 | 0.00 | 0.00 |
| 7 | 0.45 | 34.14 | 0.81 | 0.00 | 0.00 |
| 8 | 0.47 | 27.51 | 2.16 | 0.00 | 0.00 |
| 9 | 0.49 | 22.95 | 3.57 | 0.00 | 0.00 |
| 10 | 0.50 | 17.93 | 4.96 | 0.00 | 0.00 |
| 11 | 0.52 | 12.84 | 6.76 | 0.00 | 0.00 |
| 12 | 0.54 | 9.68 | 9.56 | 0.00 | 0.00 |
| 13 | 0.55 | 7.18 | 12.13 | 0.00 | 0.00 |
| 14 | 0.57 | 5.34 | 14.49 | 0.00 | 0.00 |
| 15 | 0.59 | 4.01 | 16.78 | 0.00 | 0.00 |
| 16 | 0.60 | 2.98 | 18.67 | 0.00 | 0.00 |

TABLE 1-continued

| Eluate Sample No. | Eluate Sampled L/L-R | Concentration (g/l) Ash-color | Oligosaccharides | Glucose | Glucose content (%) |
|---|---|---|---|---|---|
| 17 | 0.62 | 1.66 | 20.45 | 0.00 | 0.00 |
| 18 | 0.64 | 1.33 | 21.73 | 0.00 | 0.00 |
| 19 | 0.66 | 0.00 | 19.97 | 58.21 | 74.46 |
| 20 | 0.67 | 0.00 | 5.15 | 572.84 | 99.11 |
| 21 | 0.69 | 0.00 | 2.67 | 763.21 | 99.65 |
| 22 | 0.71 | 0.00 | 1.51 | 586.12 | 99.74 |
| 23 | 0.72 | 0.00 | 0.84 | 333.99 | 99.75 |
| 24 | 0.74 | 0.00 | 0.33 | 216.95 | 99.85 |
| 25 | 0.76 | 0.00 | 0.12 | 139.60 | 99.91 |
| 26 | 0.77 | 0.00 | 0.04 | 91.44 | 99.95 |
| 27 | 0.79 | 0.00 | 0.02 | 51.90 | 99.96 |
| 28 | 0.81 | 0.00 | 0.01 | 25.00 | 99.96 |

What is claimed is:

1. A process for producing glucose having a purity of 97% or more, comprising the steps of:

(a) subjecting liquified starch to a saccharification reaction with glucoamylase;

(b) discontinuing the saccharification reaction of the liquified starch at a point where the glucose content is in the range of 80 to 93% by weight on a solid basis;

(c) passing the resulting saccharified solution through a softening column in which calcium and magnesium ions present in said solution are replaced with sodium ions of a cation-exchange resin in the sodium form;

(d) passing the softened saccharified solution from step (c) through a chromatography column packed with beads of a cation-exchange resin in the sodium form and thereby eluting an ash-color fraction, an oligosaccharide fraction, and a glucose fraction in this order; and (e) recovering the resulting glucose fraction as glucose having a purity of 97% or more, the oligosaccharide fraction as starch syrup or an oligosaccharide product and the ash-color fraction as an additive to livestock feed; and optionally (f) recycling the oligosaccharide fraction eluted in step (d) to the saccharification reaction step (a).

2. A process for producing high-purity glucose as claimed in claim 1 wherein the saccharification reaction is carried out at a temperature of 55° to 65° C. for a period of 10 to 36 hours.

3. A process for producing high-purity glucose as claimed in claim 1 wherein the oligosaccharide fraction eluted in step (d) is recycled directly to the liquified starch saccharification step (a).

4. A process for producing high-purity glucose as claimed in claim 1 wherein the oligosaccharide fraction eluted in step (d) is concentrated and then recycled to the liquified starch saccharification step (a).

5. A process for producing high-purity glucose as claimed in claim 1 wherein the saccharified solution is filtered and concentrated before being introduced to the chromatography column in step (d).

6. A process for producing glucose having a purity of at least 98% comprising the successive steps of:

(a) subjecting liquified starch to an enzymatic saccharification reaction with glucoamylase at a temperature of 55° to 65° C. for a period of 10 to 36 hours;

(b) discontinuing the saccharification reaction of the liquified starch at a point where the glucose content is in the range of 80 to 93% by weight on a solid basis;

(c) passing the resulting saccharified solution through a softening column in which calcium and magnesium ions present in said solution are replaced with sodium ions of a cation-exchange resin in the sodium form;

(d) passing the softened saccharified solution from step (c) through a chromatography column packed with beads of a cation-exchange resin and thereby eluting an ash-color fraction, an oligosaccharide fraction, and a glucose fraction in this order;

(e) recovering the resulting glucose fraction as glucose having a purity of at least 98%; and optionally (f) recycling the oligosaccharide fraction eluted in step (d) to the saccharification reaction step (a).

* * * * *